United States Patent [19]

Kohno

[11] Patent Number: 5,415,061
[45] Date of Patent: May 16, 1995

[54] FLYWHEEL FOR POWER TRANSMISSION SYSTEM HAVING EQUIANGULARLY SPACED DASHPOTS

[75] Inventor: Satoshi Kohno, Kanagawa, Japan

[73] Assignee: Atsugi Unisia Corporation, Japan

[21] Appl. No.: 179,816

[22] Filed: Jan. 11, 1994

Related U.S. Application Data

[63] Continuation of Ser. No. 938,592, Sep. 3, 1992, abandoned, which is a continuation of Ser. No. 643,481, Jan. 22, 1991, abandoned.

[30] Foreign Application Priority Data

Jan. 24, 1990 [JP] Japan ................. 2-14270

[51] Int. Cl.[6] .................. F16F 15/16; B60K 17/00
[52] U.S. Cl. ................... 74/574; 192/106.1; 464/27
[58] Field of Search .......... 74/574, 572, 573 F; 464/24, 27; 192/106.1

[56] References Cited

U.S. PATENT DOCUMENTS

| 1,751,496 | 3/1930 | Sandner | 74/574 |
|---|---|---|---|
| 2,380,672 | 7/1945 | Opitz | 464/27 |
| 3,528,265 | 9/1970 | Brinson | 64/26 |
| 3,837,182 | 9/1974 | Kulhavy | 64/26 |
| 3,837,182 | 9/1974 | Kulhavy | 64/26 |
| 4,148,200 | 4/1979 | Schallhorn et al. | 464/27 |
| 4,464,822 | 8/1984 | Pfeifer | 74/574 X |
| 4,485,906 | 12/1984 | Lutz et al. | 192/106.1 |
| 4,555,008 | 11/1985 | Nagano | 464/27 X |
| 4,572,344 | 2/1986 | Moriuchi et al. | 192/106.1 |
| 4,913,275 | 4/1990 | Kobayashi et al. | 192/106.1 |
| 4,938,729 | 7/1990 | Hamada et al. | 192/106.1 X |

FOREIGN PATENT DOCUMENTS

| 591913 | 7/1925 | France | 464/27 |
|---|---|---|---|
| 847766 | 10/1939 | France | 74/574 |
| 977636 | 11/1950 | France | 74/574 |
| 2565655 | 12/1985 | France . | |
| 165370 | 11/1904 | Germany . | |
| 970740 | 7/1953 | Germany . | |
| 59-131043 | 7/1984 | Japan . | |
| 219146 | 9/1991 | Japan | 74/574 |
| 383689 | 11/1932 | United Kingdom | 74/574 |
| 569787 | 6/1945 | United Kingdom | 464/27 |
| 1199175 | 7/1970 | United Kingdom . | |
| 2022776 | 12/1979 | United Kingdom . | |
| 2078908 | 1/1982 | United Kingdom | 464/27 |
| 2122725 | 1/1984 | United Kingdom . | |
| 2138538 | 10/1984 | United Kingdom . | |
| 2149477 | 6/1985 | United Kingdom . | |
| 1213284 | 3/1986 | U.S.S.R. | 74/574 |

Primary Examiner—Dirk Wright
Assistant Examiner—Khoi Q. Ta
Attorney, Agent, or Firm—Ronald P. Kananen

[57] ABSTRACT

A flywheel includes an input member secured to a drive shaft, an output member rotatably supported on the input member, and a plurality of dash pots for connecting the input and output members to each other. The dash pots serve to transmit torque from the drive shaft to the output member and to damp torsional vibration transmitted from a drive shaft to the input member.

7 Claims, 2 Drawing Sheets

FLYWHEEL FOR POWER TRANSMISSION SYSTEM HAVING EQUIANGULARLY SPACED DASHPOTS

This application is a continuation of application Ser. No. 07/938,592 filed Sep. 3, 1992, which is a continuation of Ser. No. 07/643,481 filed Jan. 22, 1991, both now abandoned.

BACKGROUND OF THE INVENTION

1. Field of The Invention

The present invention relates generally to a flywheel for a power transmission system which transmits driving force from an engine or the like. More specifically, the invention relates to a flywheel which can damp a torsional vibration transmitted thereto.

2. Description of The Background Art

In recent years, various attempts have been made to decrease vibrations and noises in a vehicular body by decreasing vibrations in a power transmission system. For example, Japanese Patent First (unexamined) Publication (Tokkai Sho.) No. 59-131043 discloses a flywheel which can damp or attenuate torsional vibrations of a drive shaft. This flywheel comprises an input member fixed to a drive shaft, an output member engaging the input member so as to be rotatable relative thereto, and a fluid clutch for connecting the input and output members to each other. When torsional vibrations are caused on the drive shaft due to variations of engine torque, this flywheel is designed to produce a fluid viscous resistance in the fluid clutch to damp or attenuate the torsional vibrations of the drive shaft while it transmits the engine torque from the input member to the output member.

In the case of this flywheel, the fluid clutch comprises a plurality of discs, each of which is rotatable relative to the adjoining disc, so that the fluid viscous resistances caused by the relative rotations of the discs damp torsional vibrations of the drive shaft. However, in such a flywheel, it is difficult to make dimensions between the adjoining discs accurate, that is; it tends to produce dispersion in distances between the adjoining discs. For that reason, there is a disadvantage in that great dispersion in viscous resistance value (i.e., a torsional vibration damping force) tends to occur between one and another of the products when manufactured.

SUMMARY OF THE INVENTION

It is therefore a principal object of the present invention to provide a flywheel for a power transmission system, which can be accurately manufactured so that the flywheels have even torsional vibration damping characteristics.

In order to accomplish the aforementioned and other objects, a flywheel for a power transmission system, according to the present invention, has a plurality of dash pots for connecting input and output members to each other.

According to one aspect of the present invention, a flywheel for a power transmission system for transmitting torque from a driving unit to a driven unit, comprises: an input member secured to a drive shaft of the driving unit to rotate therewith; an output member rotatably supported on the input member and being engageable with the driven unit; and a plurality of dash pots for connecting the input and output members to each other to transmit torque from the driving unit to the driven unit via the input and output members while the dash pots are associated with each other for damping torsional vibration transmitted from the drive shaft to the input member.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
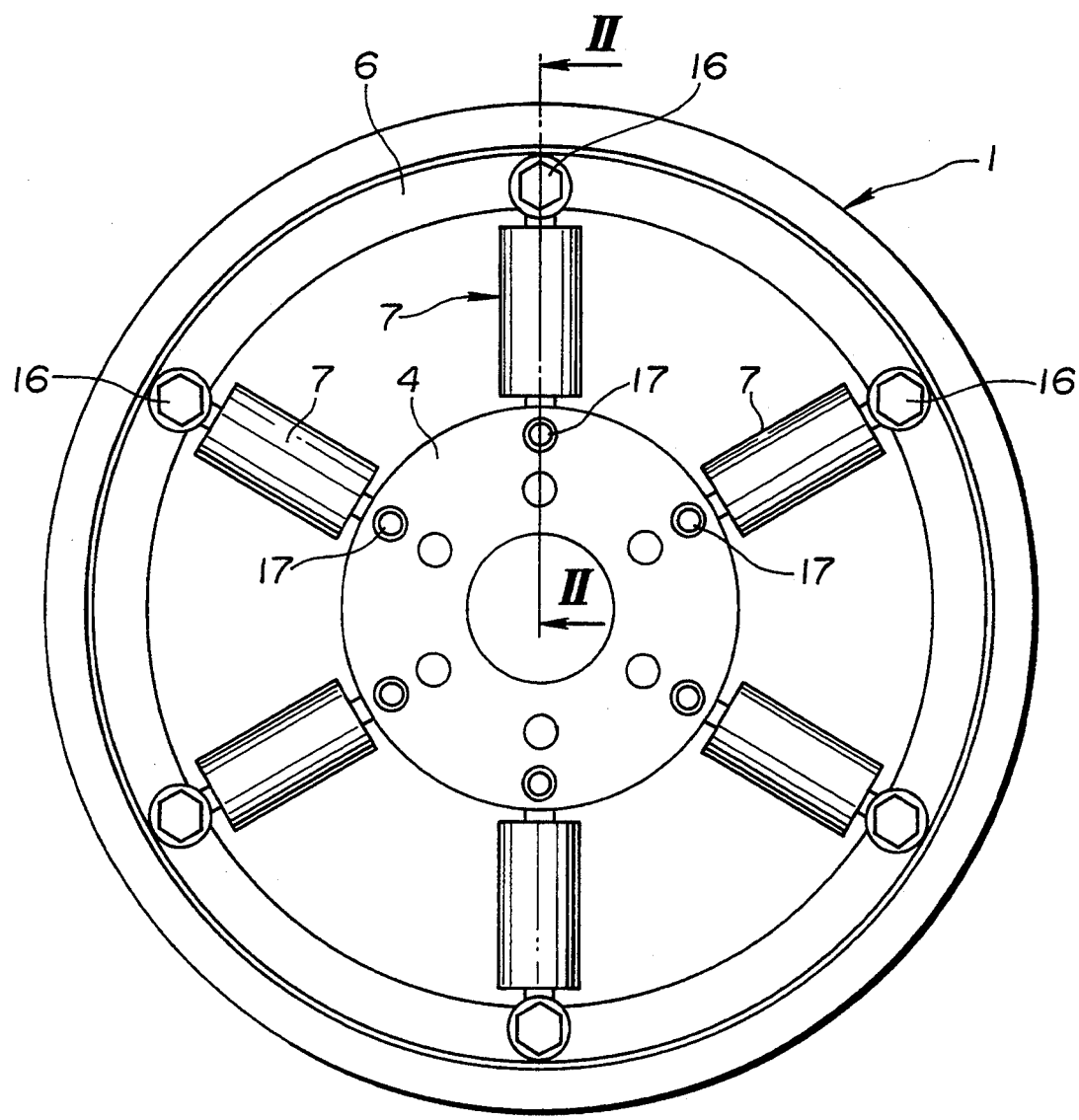
FIG. 1 is a plan view of the preferred embodiment of a flywheel for power transmission systems, according to the present invention.
Figure 2:
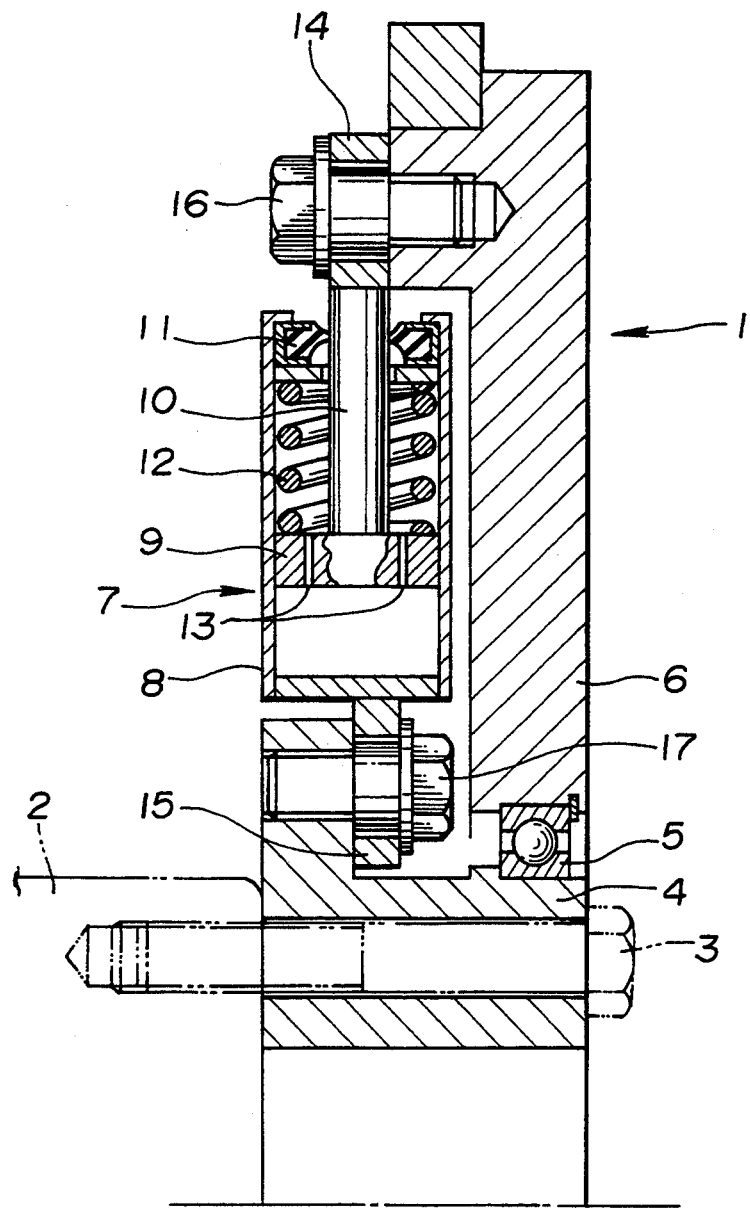
FIG. 2 is a sectional view of the flywheel of FIG. 1, taken along line II—II of FIG. 1.

Referring now to the drawings, particularly to FIGS. 1 and 2, there is shown the preferred embodiment of a flywheel 1 for power transmission systems, according to the present invention. The flywheel 1 generally comprises an input member 4, an essentially disc-shaped output member 6 and a plurality of dash pots 7. The input member 4 is arranged around and fixed to a drive shaft 2 by means of a bolt 3 so as to be rotatable with the drive shaft 2. The output member 6 is arranged around the input member 4 via a bearing 5 to be rotatably supported thereon. The dash pots 7 are so arranged as to extend in radial directions at regular intervals.

The dash pots 7 generally comprises a cylinder 8 containing therein a working fluid, a piston 9 slidably housed within the cylinder 8 for dividing the interior of the cylinder 8 into two chambers, a piston rod 10 connected to the piston 9 to extend in a longitudinal direction, and a sealing member 11 coming into contact with the piston rod 10 to prevent leakage of the working fluid from the cylinder 8. In addition, a coil spring 12 is housed in the upper chamber of the cylinder 8. The coil spring 12 serves as a returning means which causes the piston 9 to return to a predetermined position in the cylinder 8. The piston 9 has orifices 13 which allow the working fluid in one of the chambers of the cylinder 8 to be introduced into the other chamber. When the piston 9 moves in the cylinder 8, the working fluid passes through the orifices 13, which causes viscous resistances therein. The respective dash pots 7 are formed with mounting portions 14 and 15 at both of one end portion of the piston rod 10 and the closed end portion of the cylinder 8. The output and input members 6 and 4 are pivotably supported on the mounting portions 14 and 15 by means of bolts 16 and 17, respectively.

The dash pots 7 can be manufactured in a relatively easy manner, and the orifices 13 can be accurately formed. Therefore, there is a little dispersion in resistances (i.e., the damping forces) caused by the respective dash pots 7. In addition, since the sealing member 11 of the dash pot 7 is arranged only between the cylinder 8 and the piston rod 10, the dash pots 7 of the invention have superior sealing characteristics compared with conventional dash pots.

Furthermore, the interior of the cylinder 8 of the dash pot 7 need not contain therein only working fluid, but it may also contain therein a gas, e.g. air, in order to absorb variations of volume of the working fluid due to variations of temperature.

With this construction, the operation of the preferred embodiment of a flywheel for a power transmission system, according to the present invention, is described below.

When a clutch disc (not shown) comes into contact with the output member 6 of the flywheel 1, the driving torque is transmitted from the drive shaft 2 to an output shaft (not shown) via the flywheel 1 and the clutch disc. However, immediately after the clutch disc comes into contact with the output member 6, the output member 6 is momentarily slowed relative the speed of the input member 4. Since the length of the dash pots 7, i.e. the distance between the mounting portions 14 and 15, can increase, the dash pots 7, due to the fluid resistance thereof and the spring force of the spring 12, can prevent a jolt, or shock from occurring in the transmission due to returning force of the output member, as it returns to a speed equal that of the input member 4. Therefore, the drive torque can be smoothly transmitted from the input member 4 to the output member 6 via the dash pots 7. In addition, when this driving torque is transmitted, if torsional vibrations of the drive shaft 2 occur due to variations of torque and so forth, this torsional vibration of the drive shaft 2 causes vibrations (i.e., relative movement) between the input and output members 4 and 6 of the flywheel. However, according to the present invention, the dash pots 7 can damp or attenuate the vibrations, so as to restrain the torsional vibration from being transmitted from the drive shaft 2 to the output shaft (not shown). For that reason, it is possible to decrease the torsional vibrations in the power transmission system, and to decrease noise caused by the vibrations.

When the drive shaft 2 is stopped and the load applied to the flywheel 1 is removed, the output member 6 returns to its initial position, due to the spring forces of the springs 12 of the dash pots 7.

As mentioned above, the dash pots 7 contain therein the fluid and gas. When the drive shaft 2 rotates, the gas is held out of the working range of the piston 9, that is, due to centrifugal forces acting on the cylinder the fluid is held on the side of the circumference and the gas toward the center. Therefore, there is no dispersion in the damping forces of the respective dash pots 7.

Although the spring 12 is arranged within the dash pot 7 in the shown embodiment, a combination of a dash pot having no spring and a separate spring for connecting the input and output members 4 and 6 to each other may be substituted for the dash pots which include springs. For example, a plurality of dash pots having no spring and a plurality of springs may be arranged alternately in the circumferential direction. Or alternatively, a combination of dash pots having springs and dash pots without springs may be alternated radially around the flywheel 1.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A flywheel comprising:
   an input member rotatable about an axis;
   an output member rotatably supported by said input member;
   said input member having a plurality of mounting portions which are equiangularly spaced about said axis at a fixed distance from said axis;
   said output member having a plurality, corresponding in number to said plurality of mounting portions, of mounting portions which are equiangularly spaced about said axis;
   said plurality of mounting portions of said output member being disposed equidistant on a first circle about said axis, and said plurality of mounting portions of said input member being disposed on a second circle about said axis, which second circle has a smaller radius than said first circle; and
   a plurality, corresponding in number of said plurality of mounting portions of said input member, of extensible dashpots which are pivotably connected to said mounting portions of said input member, respectively, and also to said mounting portions of said output member, respectively, each dashpot having a cylinder pivotably connected to one of said plurality of mounting portions of said input member and containing a damping fluid, and a piston rod pivotably connected to a corresponding one of said plurality of mounting portions of said output member which is spaced along the radius of said first circle from said one of said plurality of mounting portions of said input member, said piston rod of each of said plurality of dashpots having a piston slidably received in the corresponding one of said cylinders of said plurality of dashpots, each of said plurality of dashpots extending along the radius of said first circle.

2. A flywheel as claimed in claim 1, further comprising bearing means operatively disposed between said input and output members for supporting said output member around said input member.

3. A flywheel as claimed in claim 1, wherein said piston has orifice means for allowing passage therethrough of said damping fluid to allow damped telescopic motion of said piston rod relative to said cylinder.

4. A flywheel as claimed in claim 3, wherein each of said plurality of dashpots includes a spring means acting on the corresponding one of said pistons for biasing the corresponding one of said piston rods inwardly of the corresponding one of said cylinders.

5. A flywheel for a power transmission system including a drive shaft, the flywheel comprising:
   an input member adapted to be fixed to said drive shaft for rotation therewith about an axis;
   an output member arranged around said input member;
   bearing means disposed between said input and output members for supporting said output member for concentric rotation relative to said input member;
   said input member having a plurality of inner mounting portions which are equiangularly spaced about said axis at a fixed distance from said axis;
   said output member having a plurality, corresponding in number to said plurality of inner mounting portions, of outer mounting portions which are equiangularly spaced about said axis;

said plurality of outer mounting portions being disposed radially outwardly of said plurality of inner mounting portions, respectively, with respect to said axis; and a plurality of extensible dashpots which are equiangularly spaced about said axis, each dashpot having a cylinder pivotably connected to one of said plurality of inner mounting portions of said input member and containing a damping fluid, and a piston rod pivotably connected to a corresponding one of said plurality of outer mounting portions of said output member which is disposed radially outwardly of said one of said plurality of dashpots having a piston slidably received in the corresponding one of said cylinders of said plurality of dashpots, each of said plurality of dashpots having a position wherein said dashpot extends along a line orthogonal to said axis and passing a respective one of said plurality of inner mounting portions of said input member.

6. In a power transmission system including a drive shaft rotatable about a predetermined axis:

an essentially disc-shaped member having a predetermined mass;

means for connecting said essentially disc-shaped member to the drive shaft, whereby said essentially disc-shaped member functions as a flywheel;

said connecting means including an input member fixed to the drive shaft for rotation therewith about the predetermined axis, said input member having a plurality of mounting portions which are equiangularly spaced about said axis at a fixed distance from said axis and a plurality of dashpots, each of said plurality of dashpots being equiangularly spaced about said axis and pivotably connected to said input member and to said essentially disc-shaped member such as to provide an arrangement wherein an angular movement, in any one of two rotational directions, of said essentially disc-shaped member relative to said input member causes extension of all of said plurality of dashpots.

7. The system as set forth in claim 6, further comprising bearing means operatively disposed between said input member and said disc-shaped member for supporting said disc-shaped member around said input member.

* * * * *